No. 866,340. PATENTED SEPT. 17, 1907.
J. R. DAVIDSON.
COMBINED PLANTER AND FERTILIZER DISTRIBUTER.
APPLICATION FILED JULY 6, 1907.

2 SHEETS—SHEET 1.

Witnesses
J. G. Stinkel
J. J. McCarthy

Inventor
John R. Davidson
by Foster Freeman Watson &c.
Attorney

No. 866,340. PATENTED SEPT. 17, 1907.
J. R. DAVIDSON.
COMBINED PLANTER AND FERTILIZER DISTRIBUTER.
APPLICATION FILED JULY 6, 1907.
2 SHEETS—SHEET 2.
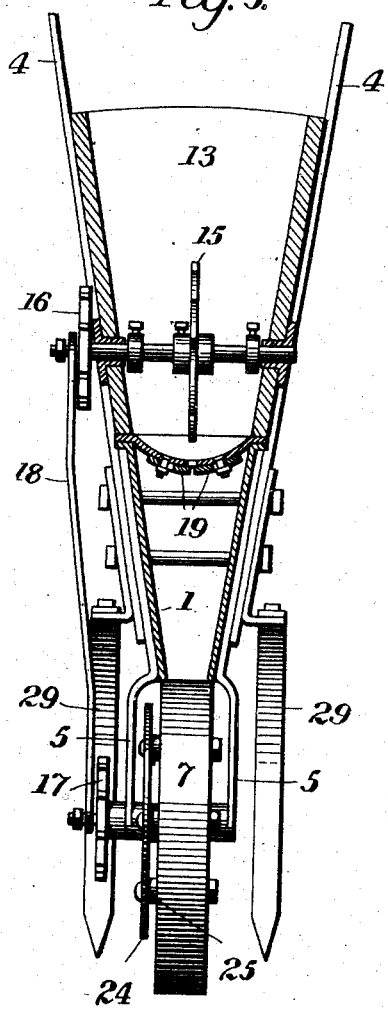
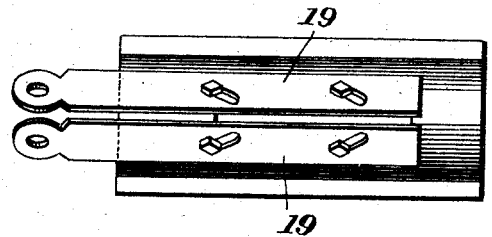
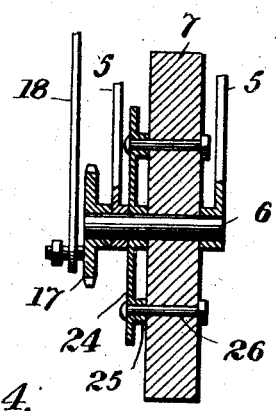
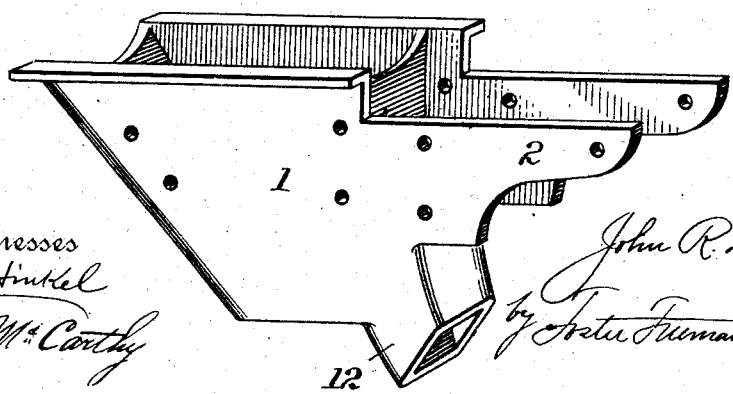
Witnesses
Inventor
John R. Davidson
by Foster Freeman Watson & Cox
Attorneys

UNITED STATES PATENT OFFICE.

JOHN R. DAVIDSON, OF MONTICELLO, GEORGIA.

COMBINED PLANTER AND FERTILIZER-DISTRIBUTER.

No. 866,340. Specification of Letters Patent. Patented Sept. 17, 1907.

Application filed July 6, 1907. Serial No. 382,517.

*To all whom it may concern:*

Be it known that I, JOHN R. DAVIDSON, a citizen of the United States, and a resident of Monticello, Jasper county, State of Georgia, have invented certain new and useful Improvements in a Combined Planter and Fertilizer-Distributer, of which the following is a specification.

The present invention relates to improvements in combined planter and fertilizer distributers and particularly to an improved machine of that character adapted for planting cotton seed.

Figure 1:
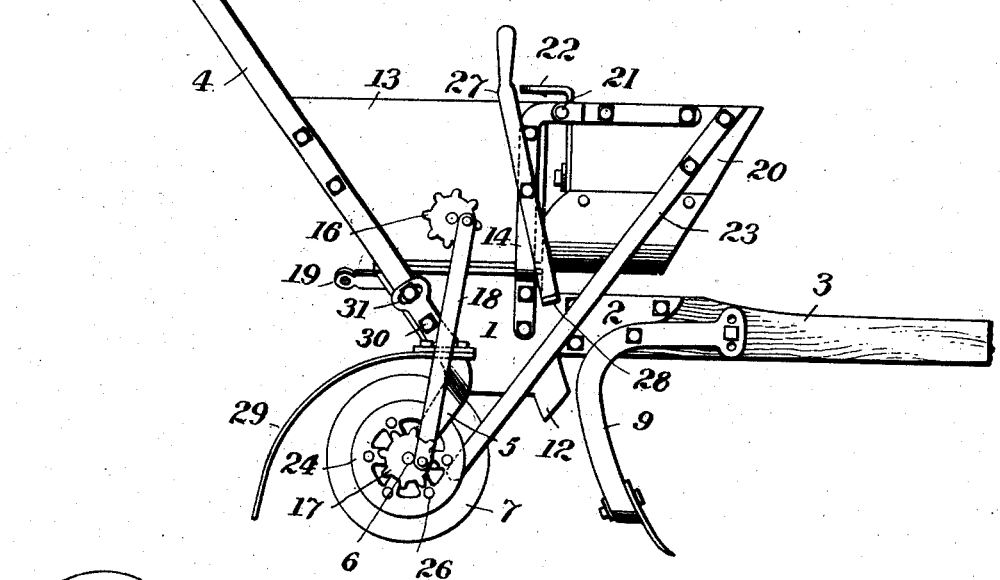
Figure 2:
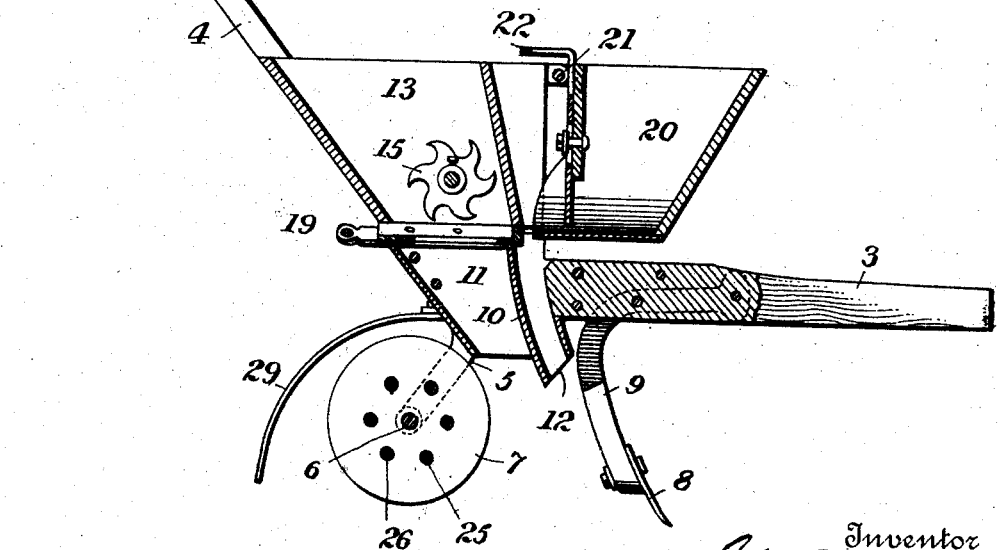

In the accompanying drawings, Figure 1 is a side elevation of a combined planter and fertilizer distributer constructed in accordance with the present invention; Fig. 2 is a longitudinal sectional view through the machine; Fig. 3 is a transverse sectional view through the same; Fig. 4 is a detail perspective view of the body of the frame of the machine; Fig. 5 is a bottom view of the seed box, showing the means for varying the width of the discharge opening; Fig. 6 is a detail sectional view through the ground wheel and parts connected therewith.

The machine includes a frame comprising a main body portion 1, formed of cast metal and provided at its forward end with parallel ears 2, between which is secured a beam 3. The handles 4 are attached to the frame section 1 and the lower ends thereof are continued downwardly and rearwardly from such body providing arms 5 in which are formed bearings for the axle 6 of the ground wheel 7. This wheel is arranged to travel in the furrow formed by a furrow opener 8 attached to the beam 3 by a suitable shank or stem 9.

The body 1 of the frame is divided by a partition 10 into two separate spouts or compartments 11, 12, the latter of which serves to conduct the fertilizer from the receptacle hereinafter referred to, and extends below the open end or outlet of the seed spout, as shown in Figs. 1 and 2.

The seed box 13 is mounted on the frame piece 1 and secured between the handles 4 and suitable braces 14 extending upwardly from the frame. Within said box is mounted a suitable feed wheel 15, the supporting shaft of which is journaled in bearings in the sides of the box; and suitably connected with the ground wheel 7 to cause said wheel 15 to agitate the seed and force the same toward the discharge slot or opening in the bottom of the seed box as the machine is moved over the ground. As shown said shaft projects beyond one side of the box and has secured thereon a sprocket 16 which may be connected by a suitable chain with a similar sprocket 17, keyed or otherwise rigidly fastened to the axle 6 of the ground wheel 7. Preferably, however, the sprockets 16, 17, are connected by a rod or link 18.

The width of the discharge opening in the bottom of the seed box may be varied and regulated as desired by means of adjustable plates 19. The fertilizer receptacle 20 is supported above the frame in advance of the seed box being pivotally connected at 21 to ears extending forwardly from the braces 14 or from the seed box 13. The said receptacle is provided with a discharge outlet at its rear end, the size of which is controlled by a slide 22.

Normally the fertilizer receptacle occupies such a position that the fertilizer will not escape therefrom and means are provided for intermittently vibrating it or rocking it about its pivotal support 21 to cause its contents to be discharged into the forward spout 12. In the embodiment of the invention illustrated such means include a rod 23 which is attached to said receptacle and extends therefrom downwardly and rearwardly into the path of a plurality of pins carried by the ground wheel 7.

Secured to one side of the ground wheel is a disk or plate 24 which is separated from said plate by a plurality of studs 25 through which extend the bolts 26 by which said plates are attached to the ground wheel. The lower end of the rod 23 extends into the space formed between said plate 24 and the ground wheel, and to such extent that as the ground wheel turns the studs 25 will successivly engage said rod and move the same and the receptacle 20 upwardly about its axis 21. The portion of the plate 24 beyond the studs 25 in connection with the adjacent face of the ground wheel, act to hold the rod 23 in the path of said studs.

If desired the fertilizer receptacle may be held in such position that the rod 23 will be out of the path of the studs 25. This is effected by shifting a lever 27 which is pivotally supported on one of the frame braces 14 and has at its forward end a lateral projection 28 adapted to contact with the inner edge of the rod 23 when said lever is rocked to elevate its forward end. The parts are thus adjusted when it is desired to move the machine without discharging any of the fertilizer, as for instance when moving from one field to another, etc. The discharge of seed from the seed box 13 at such times is of course prevented by adjusting the plates 19.

From the drawings and foregoing description the operation of the invention will be readily understood. It will be seen that all of the parts are compactly arranged, that the fertilizer is discharged at a point between the outlet from the seed box and the furrow opener 8. In operation the fertilizer is discharged almost immediately behind the furrow opener and some of the dirt thrown up by such opener will fall back and cover more or less of the fertilizer before the seed is deposited. The ground wheel 7 following in the furrow formed by the opener 8 acts to press the seed into the ground and the seed is completely covered by the action of the curved covering arms 29 supported on the lower portions of the handle bars and extending rearwardly from and on opposite sides of the ground wheel. The covering blades are adjustably supported being pivotally mounted at 30 and having at their upper ends slots 31 through which extend suitable fastening bolts. By thus supporting said blades they may be adjusted relative to the ground wheel as desired.

Having described my invention what I claim is,

1. In a combined planter and fertilizer distributer, the combination of a suitable frame, a seed box supported on said frame, a furrow opener depending from the frame in advance of the discharge outlet from the seed box, a ground wheel supporting the frame and arranged to travel in the furrow made by said opener, a fertilizer receptacle pivotally supported on the frame and adapted to discharge fertilizer at a point between the furrow opener and the outlet from the seed box, and means actuated by the ground wheel for vibrating said receptacle on its pivotal support to intermittently discharge fertilizer therefrom.

2. In a combined planter and fertilizer distributer, the combination of a suitable frame, a seed box supported on said frame, a furrow opener depending from the frame in advance of the discharge outlet from the seed box, a ground wheel supporting the frame and arranged to travel in the furrow made by said opener, a fertilizer receptacle pivotally supported at its upper rear end on the frame in advance of the seed box and adapted to discharge its contents through a spout extending downwardly between the furrow opener and the outlet from the seed box, and a rod or arm having its upper end connected with said receptacle and its lower end extending into the path of a projection on the ground wheel, whereby the fertilizer receptacle will be intermittently vibrated as said wheel turns.

3. In a combined planter and fertilizer distributer, the combination of a suitable frame, a seed box supported on said frame, a furrow opener depending from the frame in advance of the discharge outlet from the seed box, a ground wheel supporting the frame and arranged to travel in the furrow made by said opener, a fertilizer receptacle pivotally supported on the frame and adapted to discharge fertilizer at a point between the furrow opener and the outlet from the seed box, means actuated by the ground wheel for vibrating said receptacle, and means for holding the connection between the ground wheel and fertilizer receptacle in inoperative position.

4. In a combined planter and fertilizer distributer, the combination of a suitable frame, a seed box supported on said frame, a furrow opener depending from the frame in advance of the discharge outlet from the seed box, a ground wheel supporting the frame and arranged to travel in the furrow made by said opener, a fertilizer receptacle pivotally supported at its upper rear end on the frame in advance of the seed box and adapted to discharge its contents through a spout extending downwardly between the furrow opener and the outlet from the seed box, a rod connected at its upper end with the fertilizer receptacle and having its lower end extending into the path of a lateral projection on the ground wheel, and a lever adapted to move said rod from the path of the projection on the ground wheel.

5. In a combined planter and fertilizer distributer, the combination of a beam, a casting having at its forward end means for engaging the beam and having its body divided into two compartments the forward one terminating in a spout that extends below a discharge opening formed in the bottom of the rear compartment, a furrow opener depending from the beam, a ground wheel mounted between arms attached to said casting and adapted to travel in the furrow made by said opener, a pivotally supported fertilizer receptacle adapted to discharge its contents through the spout at the forward end of said casting, and a seed box mounted on said casting and communicating with the compartment therein in rear of said spout.

6. In a combined planter and fertilizer distributer, the combination of a beam, a casting connected with the beam and providing two discharge spouts arranged one in rear of the other, a furrow opener depending from the beam, a ground wheel mounted in arms attached to said casting and arranged to travel in the furrow made by said opener, a seed box secured above and communicating with the rear spout in said casting, a fertilizer receptacle pivotally supported between ears extending forwardly from the seed box and adapted to discharge its contents into the forward of said spouts, and means actuated by the ground wheel for intermittently vibrating the fertilizer receptacle.

7. In a combined planter and fertilizer distributer, the combination of a suitable frame, a furrow opener depending from the beam, a ground wheel connected with the frame and arranged to travel in the furrow made by said opener, a seed box arranged to discharge seed between the furrow opener and ground wheel, a pivotally mounted fertilizer receptacle arranged to discharge its contents at a point between the furrow opener and the outlet from the seed box, means actuated by the ground wheel for vibrating the fertilizer receptacle, and adjustable covering devices arranged in rear of and on opposite sides of the ground wheel.

In testimony whereof I affix my signature in presence of two witnesses.

JOHN R. DAVIDSON.

Witnesses:
H. V. B. ALLEN,
SAM. T. REID.